United States Patent [19]

Cooper

[11] 4,059,568

[45] Nov. 22, 1977

[54] METHOD FOR THE CONTROL OF DIAMINE CATALYZED POLYPHENYLENE ETHER POLYMERIZATION

[75] Inventor: Glenn Dale Cooper, Delmar, N.Y.

[73] Assignee: General Electric Company, Pittsfield, Mass.

[21] Appl. No.: 718,836

[22] Filed: Aug. 30, 1976

[51] Int. Cl.$^2$ ............................................ C08G 65/44
[52] U.S. Cl. .............................................. 260/47 ET
[58] Field of Search .................................. 260/47 ET

[56] References Cited

U.S. PATENT DOCUMENTS

| | | | |
|---|---|---|---|
| 3,733,299 | 5/1973 | Cooper et al. | 260/47 ET |
| 3,787,361 | 1/1974 | Nakashio et al. | 260/47 ET |
| 3,900,445 | 8/1975 | Cooper et al. | 260/47 ET |
| 3,914,266 | 10/1975 | Hay | 260/438.1 |
| 3,988,297 | 10/1976 | Bennett et al. | 260/47 ET |

Primary Examiner—Lester L. Lee
Attorney, Agent, or Firm—Morgan, Finnegan, Pine, Foley & Lee

[57] ABSTRACT

A process is disclosed for the oxidative coupling of a 2,6-di-substituted phenolic monomer with a complex copper-diamine catalyst which is moderated by the addition of a small amount of water.

19 Claims, 3 Drawing Figures

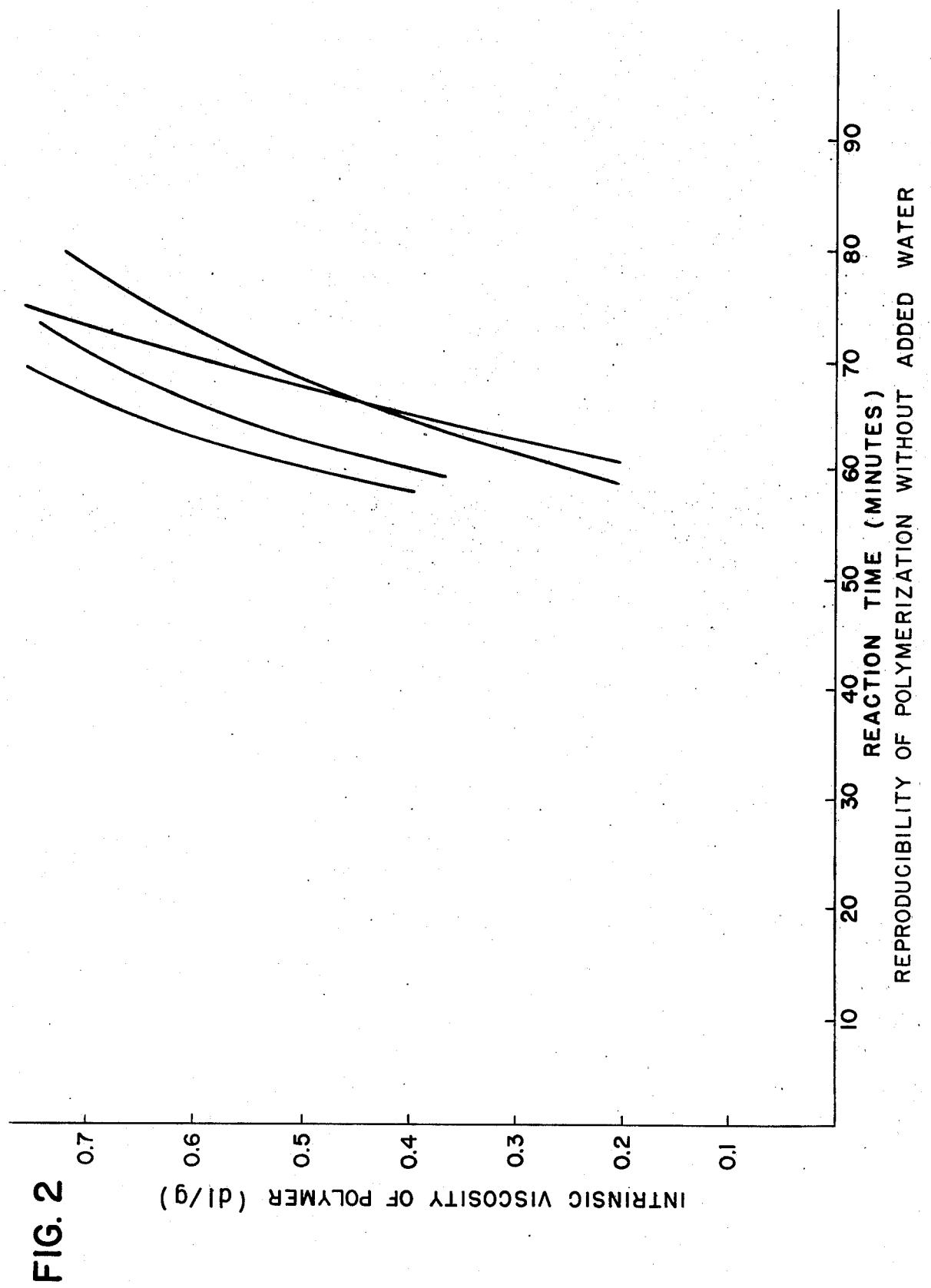

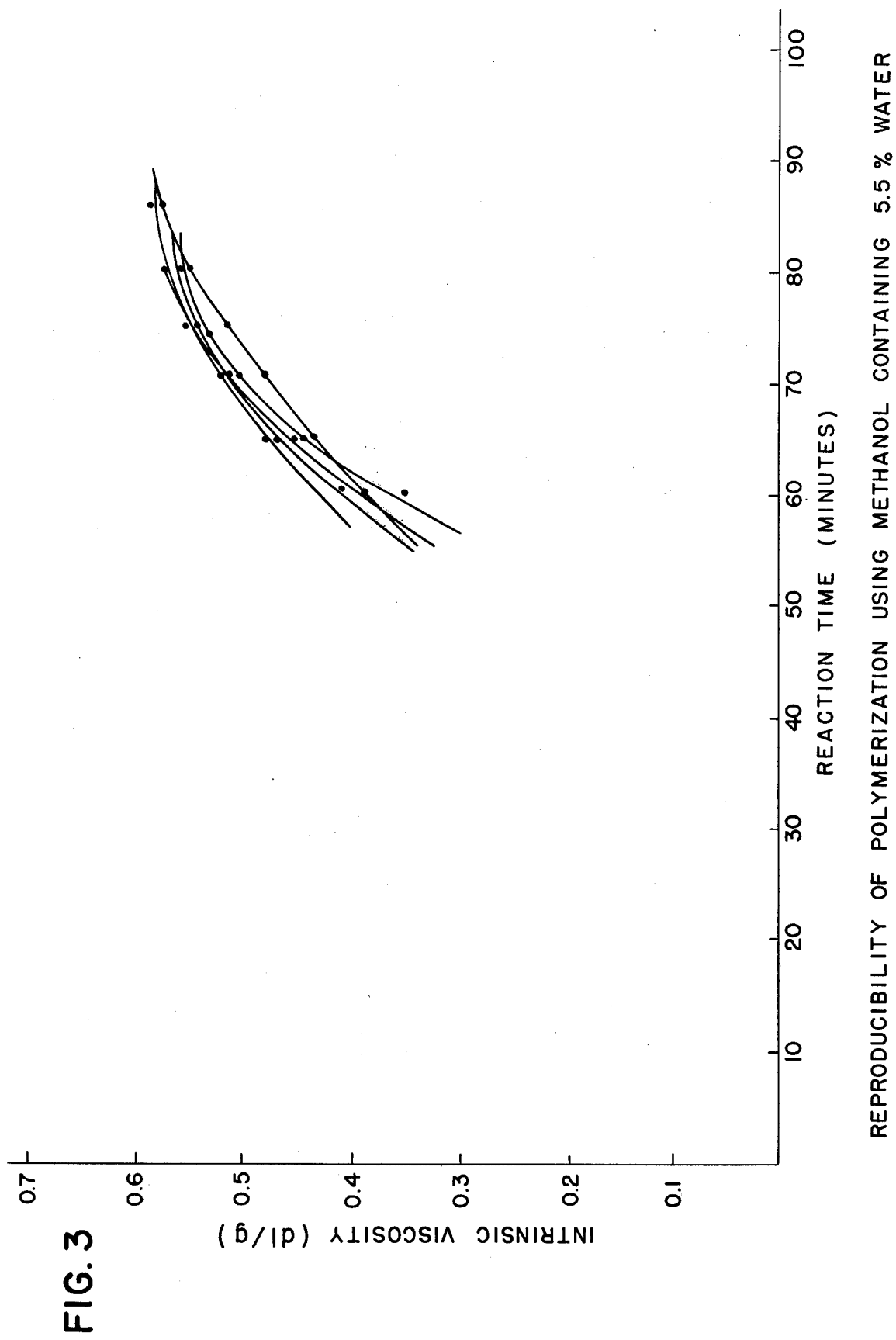
FIG. 3 REPRODUCIBILITY OF POLYMERIZATION USING METHANOL CONTAINING 5.5% WATER

METHOD FOR THE CONTROL OF DIAMINE CATALYZED POLYPHENYLENE ETHER POLYMERIZATION

The present invention is concerned with a process for the oxidative coupling of a 2,6-di-substituted phenolic monomer with a complex copper-diamine catalyst wherein the rate of oxidative coupling is moderated by the addition of minor amount of water to the polymerization mixture.

BACKGROUND OF THE INVENTION

The polyphenylene ethers and processes for their preparation are known. Various processes for their preparation are described in numerous publications including Hay, U.S. Pat. No. 3,306,874 and 3,306,875. Other procedures are described in Van Dort, U.S. Pat. No. 3,365,422, Bennett and Cooper, U.S. Pat. Nos. 3,639,656; 3,642,699; 3,733,299; 3,838,102 and 3,661,848. All of these patents are incorporated herein by reference.

The processes most generally employed in the preparation of polyphenylene ethers involve the self-condensation of a monovalent phenol in the presence of an oxygen containing gas and a catalyst. Thereafter, various procedures including the use of chelating agents, have been employed to extract the catalyst into an aqueous phase which can be separated from the polymer solution. If the chelate is soluble in the precipitating medium, the phases are not separated before the polymer is precipitated with an appropriate antisolvent.

Active catalyst systems have been developed for the preparation of 2,6-disubstituted phenolic compounds. These systems are disclosed in U.S. Pat. No. 3,914,266 which is hereby incorporated by reference. Those systems comprise a diamine, a copper compound, a tertiary amine, and a bromide source. It has been observed that these catalyst systems are extremely active and permit a reduction in the time required to obtain polyphenylene ether resins having commercially acceptable properties.

A practical disadvantage in the use of this type of catalyst is the extremely rapid rise in molecular weight which occurs during the build stage of polymerization. This rapid rate of polymerization makes it very difficult to control the molecular weight of the final product. Typically, the intrinsic viscosity may increase by 0.2 dl/g (as measured in $CHCl_3$ at 30° C) in a period of five minutes, so that an error of only a minute or so in terminating the reaction may result in an unacceptable product. This points up the desirability of a polymerization system which produces a more gradual increase in molecular weight, preferably self limiting systems in which polymer growth stops when the desired molecular weight is reached.

It has now been found that the build stage of polymerization using the above described diamine catalyst system, may be moderated by the inclusion of a small amount of water in the initial polymerization mixture. Only a small amount of water is required to achieve this result.

The profound effect of small amounts of water added at the start of the reaction is particularly surprising as the amounts of water that are required are substantially less than the amounts of water that are produced as a by-product of the polymerization reaction.

Accordingly, it is a primary object of the invention to provide a method for moderating the rate of diamine catalyzed polyphenylene ether polymerization to permit more precise control of the molecular weight of the polymer.

It is also an object of this invention to provide a method for moderating the rate of diamine catalyzed polyphenylene ether polymerization reactions with an agent that may be easily separated from the polymer product.

DETAILED DESCRIPTION OF THE INVENTION

Figure 1:
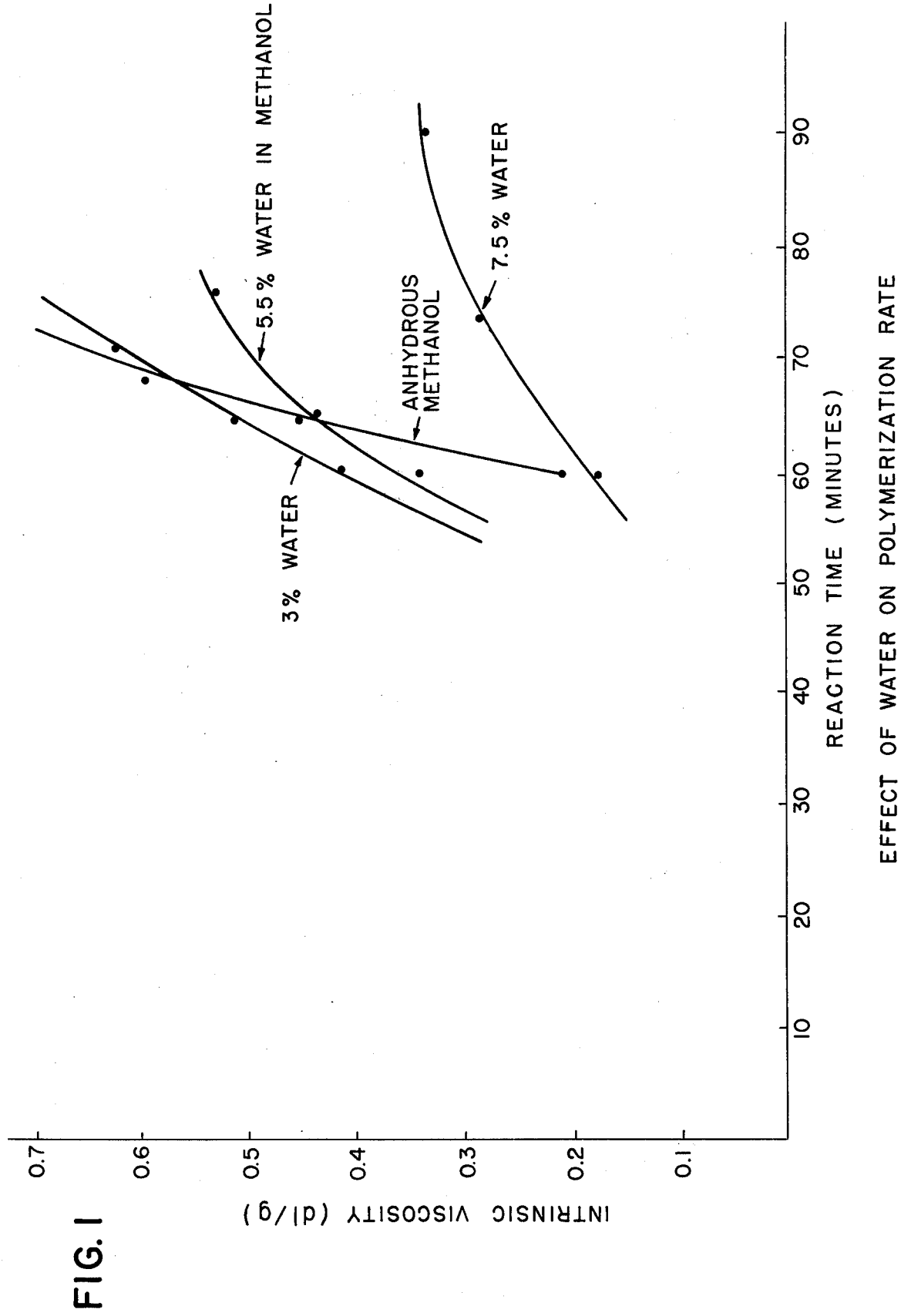

The present invention is directed to a process for forming a 2,6-disubstituted phenolic compound in the presence of a catalyst which comprises a copper compound, a diamine of the formula:

wherein each $R^1$ is independently isopropyl, a $C_{4-8}$ tertiary alkyl or a cycloalkyl group having no hydrogens on the alpha-carbon atom and $R^2$ is $C_{2-4}$ alkylene or $C_{3-7}$ cycloalkylene; a tertiary amine, a bromine compound selected from the group consisting of hydrogen bromide, alkali metal bromides, alkaline earth metal bromides, 4-bromophenols and mixtures thereof in the presence of an oxygen containing gas. To this polymerization mixture there is added an amount of water that is sufficient to control the rate of polymerization.

The amount of water that is necessary to moderate the rate of polymerization will vary according to the catalyst concentration and other polymerization conditions. Generally the effective amounts of water may be determined experimentally and it is preferred to add water to the polymerization mixture in admixture with a suitable solvent such as a lower alkanol, N-methyl pyrrolidone, acetonitrile etc. The preferred solvent is a lower alkanol of 1 to 6 carbon atoms such as methanol. Generally the lower alkanol-water mixture will constitute from 5 to 25% by weight and more preferably from 10 to 15% of the total weight of the polymerization solvent/alkanol-water mixture. The water may constitute from 2 to 15% by weight and more preferably from 4.5 to 8% of the lower alkanol-water mixture. If desired water may be added without any lower alkanol.

The improved process of the invention is broadly applicable to the preparation of polyphenylene ethers of the formula:

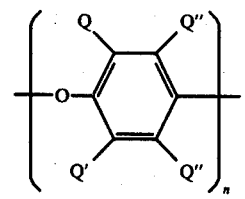

wherein Q is a hydrocarbon radical, a halogen radical having at least two carbon atoms between the carbon atom and the phenyl nucleus, and Q' and Q" are the same as Q, and in addition, halogen, provided that Q, Q' and Q" are all free of a tertiary carbon atom and n is at least 50.

The preferred polyphenylene ethers that are prepared by the process of the invention are those wherein Q and Q' are hydrocarbon radicals having from 1 to 8 carbon atoms and Q" are each hydrogen. The especially preferred polyphenylene ethers are those where Q and Q' are methyl and each Q" is hydrogen.

The process of the invention is preferably carried out by adding a secondary monoamine of the formula:

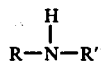

wherein R and R' are independently selected from the group consisting of lower alkyl of from 1 to 12 carbon atoms, and preferably lower alkyl of from 1 to 12 carbon atoms, and more preferably, lower alkyl of from 3 to 6 carbon atoms. An amount of a secondary mono-amine is employed that will modify the reaction so that a polyphenylene ether resin will be obtained that when combined with a styrene resin will form a composition having physical properties that are improved over compositions of a polyphenylene ether resin and a styrene resin prepared by an identical catalyst system except for the absence of a secondary mono-amine.

Examples of secondary mono-amines that may be employed are found in the above-mentioned Hay patents. Suitable lower alkyl substituents include methyl, ethyl, n-propyl, i-propyl, n-butyl, n-hexyl, n-octyl, n-decyl and the like. If a secondary mono-amine is employed, it is preferred to utilize di-n-butylamine. The discovery of the use of secondary mono-amines in conjunction with diamine catalysts is not a part of this invention and is described and claimed in application Ser. No. 718,834 which is hereby incorporated by reference.

The tertiary amine should be one having low steric requirements. Examples of these compounds are tri-lower alkyl amines wherein the alkyl groups are of from 1 to 6 carbon atoms such as trimethylamine or n-butyldimethylamine. If desired cyclic tertiary amines such as N-methylpyrrolidine may be employed. The preferred species is n-butyldimethyl amine.

The useful 4-bromophenols include 4-bromo-2,6-disubstituted phenols such as 4-bromoxylenol and the like. The alkali metal bromides and alkaline earth metal bromides include bromides such as sodium bromide, calcium bromide and the like. Other bromides are listed in U.S. Pat. No. 3,733,299 which is thereby incorporated by reference.

Copper bromide-4-bromoxylenol solutions may be prepared for use in the practice of the invention by adding bromine to a suspension of cupric carbonate or cuprous oxide containing an excess of 2,6-xylenol. The bromine reacts with the xylenol to produce 4-bromoxylenol, the hydrogen bromide produced in this reaction converts the copper compound to a copper bromide.

The molar ratio of the tertiary amine to copper may be from 10 to 40 moles/g. atom and preferably from 20 to 40 moles/g. atom of copper. The molar ratio of 2,6-di-substituted phenol to copper is from 400:1 to 1500:1 and preferably 500:1 to 1000:1. The ratio of atoms of bromide per atom of copper is from 5:1 to 50:1 and preferably 5:1 to 30:1. The diamine may be employed at a ratio of 1 to 3 moles of diamine per g/atom of copper preferably 1 to 2 moles per gram atom.

If the process is to be carried out with a secondary mono-amine, a weight ratio of 2,6-di-substituted phenolic compound to secondary monoamine of from 50:1 to 500:1 may be employed and more preferably, a ratio of 100:1 to 300:1 may be employed.

The particular copper compound is not critical. Useful copper compounds include cuprous chloride, cuprous bromide, cuprous sulfate, cuprous azide, cuprous tetramine sulfate, cuprous acetate, cuprous butyrate, cuprous toluate, cupric chloride, cupric bromide, cupric sulfate, cupric azide, cupric tetramine sulfate, cupric acetate, cupric toluate, and the like. Preferred cuprous and cupric salts are the halides, cuprous bromide and cupric bromide being most preferred. These compounds may be prepared in situ by the reaction of bromine or hydrogen bromide with cuprous oxide or cupric carbonate.

The catalyst may be prepared in accordance with procedures known in the art, using methanol as the catalyst solvent.

The reaction is preferably carried out with oxygen as the oxygen-containing gas, although air and mixtures of air with inert gases may be employed. It is preferred to employ an aromatic solvent such as benzene or toluene as the reaction medium. Other solvents mentioned in the Hay patents may also be employed.

The process of the invention may be carried out in any suitable reaction vessel by first charging the solvents and the catalyst. Thereafter an oxygen stream may be started and the monomer gradually metered in while the temperature is raised from about 25° C to about 40° C. Polymerization is carried out until a polymer is obtained which has an intrinsic viscosity of about 0.4 to 0.6 as measured in chloroform at 30° C. The polymer may be recovered from the reaction mixture by employing standard methods that are well known to those skilled in the art.

A quarternary ammonium compound may be advantageously employed in the process of this invention. These compounds are of the formula:

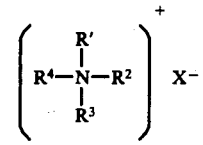

wherein $R^1$, $R^2$, $R^3$ and $R^4$ are alkyl, aralkyl and alkenyl groups of from 1-24 carbon atoms and X is an anion. The preferred anions are halides such as bromine, chlorine, sulfate or phosphate.

The alkyl substituents may be methyl, ethyl, propyl, butyl, hexyl, octyl, decyl, cetyl, hexadecyl and isomers thereof. Mixtures of these compounds may also be employed. The aralkyl substituent may include alkyl-mono-carbocyclic radicals having from 7 to 20 carbon atoms such as benzyl, phenethyl and the like. The alkenyl substituents include straight and branched chain unsaturated hydrocarbon atoms of from 1-24 carbon atoms which contain one or more double bonds.

Mixtures of the ammonium salts may also be employed and the total number of carbon atoms in the $R^1$, $R^2$, $R^3$ and $R^4$ substituents should be at least 10. The quaternary ammonium salts may be employed at a range of from 50-500 ppm based on the organic reaction solvent, and more preferably 100 to 200 ppm, based on the organic reaction solvent.

The quaternary ammonium salts are well known and many are commercially available. For example, reference may be made to Kirk-Othmer Encyl. of Chemical Technology, second edition, Volume 16, pp. 859–865; Arquads, Armour Industrial Co. (1956) and Schwartz, A. M. et al, Surface Active Agents, Vol. 1, pp. 156–171 and Interscience Publishers (1949) and Vol. II, pp. 112–118 (1958), all of which are incorporated by reference. A particularly useful compound is methyl-tri-n-octylammonium chloride.

DESCRIPTION OF THE PREFERRED EMBODIMENTS

The following examples illustrate the process of this invention. They are merely illustrative and are not to be construed to limit the invention in any manner whatsoever.

EXAMPLE 1

A catalyst solution was prepared as follows:

34.8 g of 2,6-xylenol waas dissolved in 150 ml of methanol, 2.5 g of cuprous oxide was added; and 27.2 g of bromine was added to the rapidly stirred suspension cooled by means of an ice bath, over a period of thirty minutes. The ice bath was removed, stirring was continued for one hour, and methanol was added to bring the volume to 200 ml. This catalyst solution was employed in a control polymerization to demonstrate the rate of polymerization that is obtained with a diamine catalyst. This polymerization was carried out as follows:

Sixty grams of dry methanol was added to 422 ml of toluene, followed by 7 ml of the catalyst solution described hereinabove. To this solution was added 0.1 g of trioctylmethyl ammonium chloride, 0.455 g of N,N'-di-tert-butylethylene diamine, 2.66 g of butyldimethyl amine, and 1.40 g of di-n-butyl amine. This solution was transferred to a stirred reactor, a rapid stream of oxygen was introduced near the bottom of the reactor, and a solution of 140 g of 2,6-xylenol in 160 ml of toluene was added through a metering pump over a period of thirty minutes. The temperature of the reaction mixture was initially 25° C. The temperature was allowed to rise to 40° C and was held at this point for the first 60 minutes of reaction, and was then increased to 50° C. Samples were withdrawn periodically, shaken with an excess of aqueous acetic acid, and the polymer precipitated by addition of methanol. The intrinsic viscosity of the polymer isolated after sixty minutes was 0.22 dl/g; after 70 minutes it was 0.62 dl/g. (as measured in $CHCl_3$ at 30° C).

The procedure outlined above was followed except that instead of 60 g of anhydrous methanol, 60 g of methanol containing 3%, 5.5%, or 7.5% by weight of water was used. The course of the polymerization is shown by the curves of FIG. 1. With 3% water in the methanol, the growth curve was extremely steep, similar to that observed without water. With 7.5% water, reaction was slow and polymer of intrinsic viscosity preferred for molding applications (I.V. of 0.5–0.6 dl/g was not obtained. With 5.5% water in the methanol, polymer growth was gradual and it appeared from the growth curve of FIG. 1 that polymer growth ceased at about 0.58 dl/g. ($CHCl_3$ at 30° C).

The observed changes in intrinsic viscosity are reported in Table 1:

TABLE 1

| elapsed time/min. | Intrinisc viscosity ($CHCl_3$ at 30° C) | | | | |
|---|---|---|---|---|---|
| | 60 | 65 | 70 | 75 | 90 |
| anhydrous methanol | .21 | .45 | .60 | — | — |
| 3% water | .42 | .51 | .63 | — | — |
| 5.5% water | .32 | .43 | .49 | .53 | — |
| 7.5% water | .18 | — | — | .29 | .34 |

EXAMPLE 2

Five polymerizations were carried out, using anhydrous methanol and following the general procedure of Example 1. Growth curves for these polymerizations are shown in FIG. 2. A Second series of five polymerizations were performed using methanol containing 5.5% water. The total amount of water added was about 3.3 g which is a small fraction of the total amount of water produced in the reaction which was calculated to be 20.6 g. Growth curves are reported in FIG. 3. Growth was extremely fast in all the polymerizations employing dry methanol, and much more gradual in those using methanol containing 5.5% water. The superior reproducibility of the second system is shown in Table 2, in which the intrinsic viscosity of polymers isolated after a fixed reaction time are compared.

TABLE 2

| Run No. | Water | Reaction Time | Intrinsic Viscosity (dl/g)($CHCl_3$ at 30° C) |
|---|---|---|---|
| A | None | 65 mins. | .42 |
| B | None | 65 mins. | .48 |
| C | None | 65 mins. | .64 |
| D | None | 65 mins. | .39 |
| E | None | 65 mins. | .55 |
| F | 5.5 | 75 mins. | .51 |
| G | 5.5 | 75 mins. | .54 |
| H | 5.5 | 75 mins. | .53 |
| I | 5.5 | 75 mins. | .54 |
| J | 5.5 | 75 mins. | .54 |

EXAMPLE 3

A control polymerization was carried out as follows: A solution of 34.8 g of 2,6-xylenol in 125 ml. of methanol was cooled in an ice bath and 2.50 g of cuprous oxide was added. The mixture was stirred and 27.2 g of bromine was added over a period of 15 minutes. The solution was allowed to warm to room temperature and diluted to 200 ml with methanol. Five milliliters of this solution was added to 60 g of anhydrous methanol, followed by 1.9 g of butyldimethylamine, 0.325 g of N,N'-di-tert-butylethylene-diamine and 0.1 g of trioctylmethylammonium chloride. The solution was added with 460 ml of toluene to a one-liter reactor equipped with a stirrer, thermometer and an internal cooling coil. The mixture was warmed to 40° C, by circulating water from a constant temperature bath through the internal coil. The mixture was vigorously stirred, a rapid stream of oxygen was introduced near the bottom of the reactor, and a solution of 105 g of 2,6-xylenol in 122 ml of toluene was added over a period of 15 minutes. The temperature of the mixture was held at 40° C and at 55 minutes after the beginning of the reaction a sample was withdrawn, shaken with 50% aqueous acetic acid, and the polymer was precipitated from the toluene phase by the addition of methanol. It had an intrinsic viscosity, measured in chloroform at 30° C, of 0.40 dl/g; five minutes later, at 60 minutes reaction time, the intrinsic viscosity was 0.69 dl/g, and at 65 minutes the mixtures had become too viscous to stir.

A second experiment was carried out according to the present invention by substituting for the anhydrous methanol, 60 g of methanol containing 5 wt % of water. In this case the intrinsic viscosity of the polymer showed a gradual increase, eventually leveling off at 0.53 dl/g; after 55 minutes the intrinsic viscosity was 0.46 dl/g; at 60 minutes, 0.49 dl/g; and at 80 minutes 0.53 dl/g. (all intrinsic viscosities were measured in $CHCl_3$ at 30° C).

EXAMPLE 4

This example demonstrates the use of varying amounts of water in the initial polymerization mixture to moderate the reaction and to control the molecular weight of the final product. In these experiments a ten gallon stainless steel reactor equipped with a turbine-blade stirrer, oxygen and nitrogen inlet tubes, and a pump to circulate the reaction mixture through an external heat exchanger was charged with 4.0 gallons of toluene. A solution of 3.73 g of cuprous oxide in 86 g of 48% aqueous hydrobromic acid was added, followed by 5.5 g of trioctylmethyl-ammonium chloride, 105.7 g of butyldimethylamine, 17.94 g of N,N'-di-tert-butylethylenediamine and 55 g of di-n-butyl amine. 3130 ml of methanol containing 135 g of water was added (the total amount of water in the system at this point, including that added with the aqueous hydrogen bromide is 7.5 wt % of the methanol). Oxygen was introduced near the bottom of the vessel and a solution of 12.2 lbs of 2,6-xylenol in an equal weight of toluene was added over a period of 30 minutes. The temperature was allowed to increase gradually to 104° F during the first 20 minutes, held at this point until 60 minutes after the beginning of reaction and then held at 120° F for the remainder of the reaction. After 80 minutes the reactor was flushed with nitrogen and 60.8 g of a 30% aqueous solution of the disodium salt of nitrilotriacetic acid was added, followed by 2,000 ml of water and 2.0 gallons of toluene. The mixture was stirred for fifteen minutes and separated by a liquid-liquid centrifuge into polymer-toluene and methanol-water phases. The polymer was precipitated by addition of methanol, filtered, washed with methanol and dried. The final product had an intrinsic viscosity of 0.50 dl/g. ($CHCl_3$ at 30° C).

Another experiment was carried out in the same way, but using 3130 ml of anhydrous methanol, so that the only water in the initial mixture was that added with the aqueous hydrogen bromide, amounting to 1.9% of the methanol. At about 50 minutes after the beginning of reaction the viscosity of the mixture, as measured by the pressure in the circulatory pump, increased very rapidly and by 60 minutes it was no longer possible to stir or circulate the mixture and the reaction was terminated. Several other runs were made under the same conditions, but with varying amounts of water in the initial mixture with the results listed below.

| WATER (wt % of Methanol) | FINAL I.V. (dl/g)($CHCl_3$ at 30° C) |
|---|---|
| 1.9 | — |
| 5.4 | .54 |
| 7.5 | .50 |
| 9.0 | .49 |
| 12.2 | .45 |
| 16.5 | .33 |

Although the above example has shown various modifications of the present invention, other variations are possible in the light of the above teachings. It is, therefore, to be understood that changes may be made in the particular embodiments of the invention described which are within the full intended scope of the invention as defined by the appended claims.

I claim:

1. In a process for forming a polyphenylene ether resin by the oxidative coupling of a 2,6-disubstituted phenolic compound in the presence of a catalyst which comprises a copper compound, a diamine of the formula:

$$R^1HN-R^2-NHR^1$$

wherein each $R^1$ is independently isopropyl, a $C_{4-8}$ tertiary alkyl or a cycloalkyl group having no hydrogens on the alpha-carbon atom and $R^2$ is $C_{2-4}$ alkylene or $C_{3-7}$ cycloalkylene; a tertiary amine, a bromine compound selected from the group consisting of hyrogen bromide, alkali metal bromides, alkaline earth metal bromides, 4-bromophenols and mixtures thereof in the presence of an oxygen containing gas, the improvement which comprises adding to the polymerization reaction an amount of water which will control the rate of polymerization.

2. A process as defined in claim 1 wherein said polyphenylene ether is of the formula:

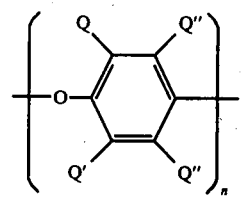

wherein Q is a hydrogen radical, a halogen radical having at least two carbon atoms between the carbon atom and the phenyl nucleus, and Q' and Q" are the same as Q and in addition, halogen, provided that Q, Q' and Q" are all free of a tertiary carbon atom and n is at least 50.

3. A process as defined in claim 1 wherein Q and Q' are hydrocarbon radicals having from 1 to 8 carbon atoms and Q" are each hydrogen.

4. A process as defined in claim 3 wherein Q and Q' are each methyl radicals.

5. A process as defined in claim 1 wherein the diamine is N,N'-di-tert butylethylene-diamine.

6. A process as defined in claim 5 wherein the tertiary amine is a tri-lower alkyl amine where the alkyl groups have from 1-6 carbon atoms.

7. In a process for forming a polyphenylene ether by the oxidative coupling of a 2,6-disubstituted phenolic compound, in the presence of a catalyst which comprises a copper compound, N,N'-di-tert-butyl ethylenediamine, a tertiary amine, a bromine compound selected from the group consisting of hydrogen bromide, alkali metal bromides, alkaline earth metal bromides, 4-bromophenols and mixtures thereof in the presence of an oxygen containing gas and a lower alkanol of from 1 to 6 carbon atoms the improvement which comprises adding from 2 to 15% by weight of water based on the amount of said lower alkanol.

8. A process as defined in claim 7 wherein the disubstituted phenolic compound is xylenol.

9. A process as defined in claim 8 wherein the lower alkanol is methanol.

10. A process as defined in claim 9 wherein the tertiary amine is butyldimethyl amine.

11. In a process for forming a polyphenylene ether by the oxidative coupling of a 2,6-disubstituted phenolic compound, in the presence of a catalyst which comprises a copper compound, N,N'-di-tert-butyl ethylenediamine, a tertiary amine and hydrogen bromide, in the presence of an oxygen containing gas and a lower alkanol of from 1 to 6 carbon atoms the improvement which comprises adding from 2 to 15% by weight of water based on the amount of lower alkanol to the reaction mixture.

12. A process as defined in claim 11 wherein the lower alkanol-water mixture constitutes from 5 to 25% by weight of the polymerization solvent/alkanol-water mixture.

13. A process in claim 12 wherein the disubstituted phenolic compound is xylenol.

14. A process as defined in claim 13 wherein the lower alkanol is methanol.

15. A process as defined in claim 14 wherein the tertiary amine is butyldimethyl amine.

16. A process as defined in claim 1 wherein the catalyst includes a minor amount of a secondary monoamine selected from compounds of the formula:

wherein R and R' are independently selected from the group consisting of lower alkyl of from 3 to 6 carbon atoms.

17. A process as defined in claim 16 wherein the catalyst includes di-n-butyl amine.

18. A process as defined in claim 15 wherein the catalyst includes a minor amount of di-n-butylamine.

19. In a process for forming poly(2,6-dimethyl-1,4-phenylene ether) by the oxidative coupling of 2,6-xylenol in the presence of a catalyst which a cuprous copper compound, N,N'-di-tert-butyl ethylenediamine, butyldimethyl amine and hydrogen bromide, in the presence of an oxygen containing gas and methanol, the improvement which comprises adding from 2 to 15% by weight of water based on the amount methanol to the reaction mixture, the total amount of methanol and water constituting from 5 to 25% by weight of the polymerization solvent/methanol-water mixture.

* * * * *